US007975373B2

(12) United States Patent
Hartmann et al.

(10) Patent No.: US 7,975,373 B2

(45) Date of Patent: Jul. 12, 2011

(54) DEVICE FOR MOLDING OF PLUGS AS A PART OF A PIPE CONNECTION

(75) Inventors: Harald Hartmann, Dornbrin (AT); Werner Bachmann, Hard (AT)

(73) Assignee: Henn GmbH & Co. KG, Dornbirn (AT)

( * ) Notice: Subject to any disclaimer, the term of this patent is extended or adjusted under 35 U.S.C. 154(b) by 1341 days.

(21) Appl. No.: 11/530,248

(22) Filed: Sep. 8, 2006

(65) Prior Publication Data

US 2007/0057393 A1 Mar. 15, 2007

(30) Foreign Application Priority Data

Sep. 10, 2005 (DE) ......................... 10 2005 043 140

(51) Int. Cl.
*B23P 21/00* (2006.01)

(52) U.S. Cl. ........... 29/787; 29/402.02; 29/712; 29/721; 29/795; 264/40.1; 264/272.11; 264/320; 425/393

(58) Field of Classification Search ............... 29/402.02, 29/712, 721, 729, 787, 795; 264/40.1, 272.11, 264/320; 425/393

See application file for complete search history.

(56) References Cited

U.S. PATENT DOCUMENTS

| | | | | |
|---|---|---|---|---|
| 5,855,399 | A | 1/1999 | Profunser | |
| 7,387,318 | B2 * | 6/2008 | Yoshida | 285/321 |
| 7,614,665 | B2 * | 11/2009 | Hartmann | 285/321 |

FOREIGN PATENT DOCUMENTS

| | | |
|---|---|---|
| DE | 2613240 | 10/1977 |
| DE | 40 05 826 | 8/1991 |
| DE | 195 22 690 | 1/1997 |
| DE | 29820718 | 3/1999 |
| EP | 0637473 | 8/1995 |
| NL | 8300123 | 8/1984 |
| WO | WO 2005/047751 | 3/2005 |
| WO | 2005-046906 | 5/2005 |
| WO | 2005-047751 | 5/2005 |

OTHER PUBLICATIONS

Search Report for corresponding European Patent Document EP 06 01 6767, Dec. 27, 2006.

Statement of EPO regarding European Search Report of equivalent application EP 06 01 6767, Jan. 24, 2007.

* cited by examiner

*Primary Examiner* — Paul D Kim

(74) *Attorney, Agent, or Firm* — Baker & Daniels LLP

(57) ABSTRACT

A device and method for the molding of plugs as part of a pipe connection wherein the pipe connection is constructed as a sealing plug-in connection with a connecting piece and a plug that can be locked with the connecting piece. A molding slot is placed in the material of the plug with an expanding tool acting in a radial direction and a sensor subject to the radial deformation is arranged in the expanding jaw. The sensor records the radial deformation work of the expanding jaw and regulates the expanding drive.

17 Claims, 7 Drawing Sheets

DEVICE FOR MOLDING OF PLUGS AS A PART OF A PIPE CONNECTION

Figure 1:
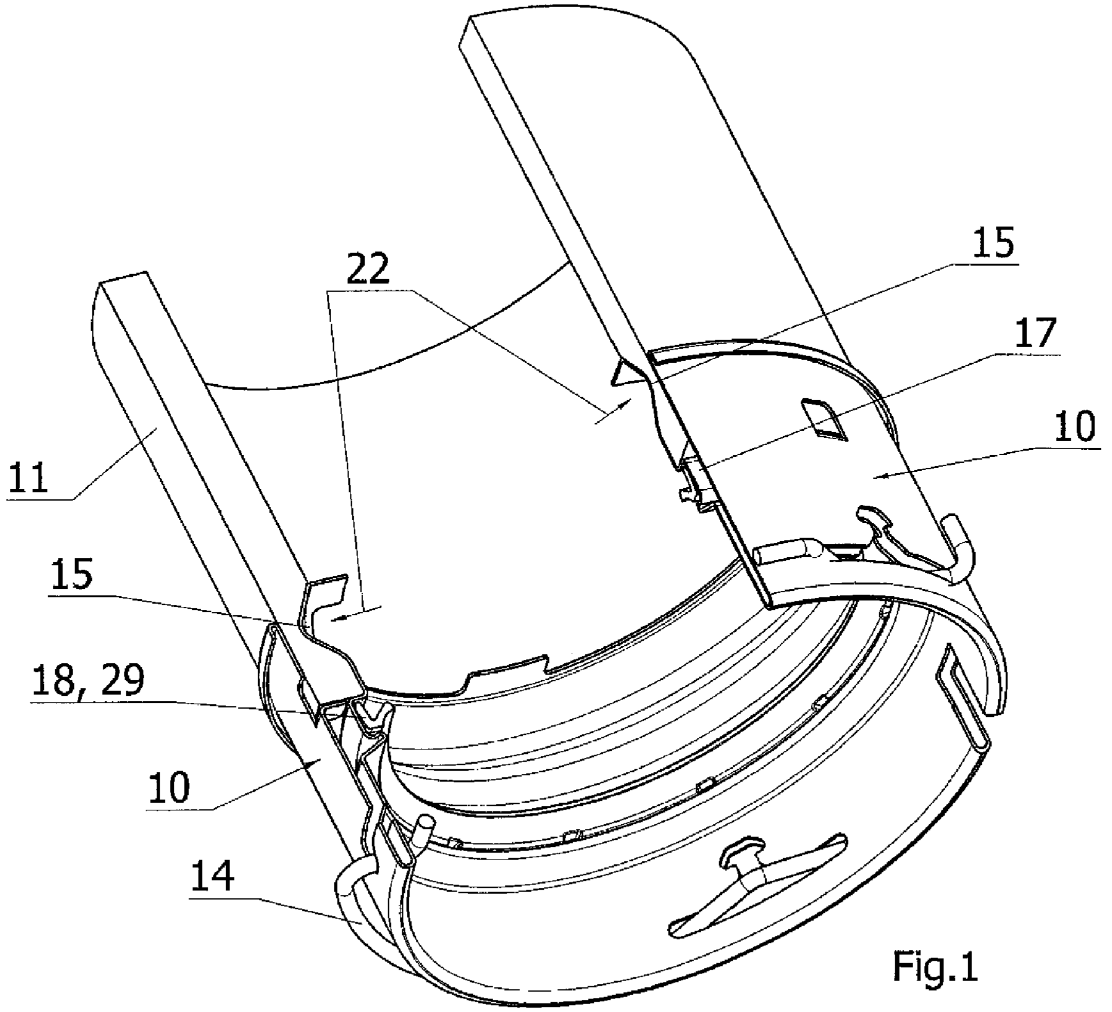

The object of the invention is a method and a device in accordance with the generic term of patent claim 1.

There are a number of publications going back to the same applicant in which the function of a plug-in connection is described as part of a sealing pipe connection.

Reference is made to PCT/EP2004/001886 only as an example, in which the function of such a plug-in connection is described.

The same applies for U.S. Pat. No. 5,855,399 or PCT/WO2005/047751 A1.

The object of the pipe connections is to produce a sealing plug-in connection between a plug and a connecting piece.

In the case of such plug-in connections the connection of a hose to be joined to the plug is problematic. In the previously described publications provision is made for the plug to form an annular mounting area into which the front end of the hose engages, wherein the inner part of the plug is formed with an expanding tool placed on the inside wall of the plug in such a way that a rotary molding slot directed radially outward results which presses the hose together on the total periphery in diameter lessening manner in the annular gap of the plug. In this way the hose is firmly held in a sealing manner in the annulus of the plug by the named mold connection.

However, difficulties have arisen in the production of this molding slot. The problem in this connection is that the hose does not always exhibit a constant diameter and in particular the wall thickness also varies.

If one always formed the molding slot with the same depth, then it can happen that the connection is not seated sufficiently securely in the case of hoses with slight wall thickness. The density of this connection can also be impaired.

The invention is thus based on the object of further developing a method and a device for the molding of elastomer hoses in plugs as part of a pipe connection in such a way that a secure and operable molding connection is produced between the plug and the elastomer hose, said molding connection being independent of wall thicknesses of the plug, the hose and the like.

The term "hose" is interpreted broadly within the scope of the present invention. Not just an elastomer hose is understood, but rather also a pipe which also does not necessarily have to be an elastomer. It can also be conventional plastic pipes in which it is also possible on the basis of the material properties to form the material in such a way that a molding seam directed radially outwards in the inner part of the plug engages in the material of the pipe.

For the solution of the problem the invention is characterized by the fact that a molding slot is inserted in the material of the plug with an expanding tool acting in radial direction, said molding slot engaging in the material of the pipe or hose and by the fact that a sensor subjected to radial deformations is arranged at least at one place of the expanding jaw, said sensor recording the radial resiliency of the expanding work and therewith regulating the expanding drive.

With the given technical teaching a completely new method is described which is geared toward a direct recording of the deformation forces in the molding of hoses, pipes and the like.

With this a direct measuring system for an automatic assembly machine for the production of the mentioned moldings is realized, wherein with this simultaneously a tool breakage monitoring of the expanding tool is also given.

A monitoring of the screw tightening torque of fastening screws is also given with the technical teaching of the invention, said fastening screws constituting the connection between the actual expanding tool and the diagonal sliders expanding shoulder to be placed on the expanding tool.

One significant advantage of a further embodiment of the invention lies in the fact that the molding slot is arranged directed from the inner circumference of the plug to the outside. With this the advantage results that the expanding forces can be measured directed from radial inside to radial outside, which is a significant advantage compared to the state of the art, in which the expanding forces can only be recorded in the radial exterior region of the plug (indirectly).

The technical teaching of the invention also results in the advantage that the formation of cracks is avoided in the molding operation, as a result of which the molding connection produced in this way is free from cracks and therefore works reliably.

Slight wall thickness differences both in the hose as well as in the plug can be detected and compensated with the inventive method.

In the case of known systems the molding pressure is only recorded via the measurement of the path or of the pressure, however not via a measurement of force. With this wall thickness variations of the molding materials (plug and pipe or hose) cannot be monitored precisely enough. It is also known to record the forces indirectly on the outer diameter of the plug, which however is susceptible to trouble because only an indirect measurement takes place and as a result of this the measuring accuracy is impaired.

Therefore the following items represent the advantage of the invention:

- Direct measurement of the occurring deformation force in the smallest space
- Monitoring of tool breakage
- Monitoring of the tightening torque of the tool fastening screws
- Breakage monitoring of the tool fastening screws
- Detection and monitoring of slight wall thickness differences of the hose, the pipe and the plug part
- Crack detection of the plug parts, pipes and hoses
- Tolerance minimization with regard to concentricity
- Cost effective, less susceptible to trouble
- Extreme bends of hose, pipe, . . . are possible since the holding fixture is made from the inside Thus with the invention in a certain form thereof a path-dependent power control system of the molding between hose, pipe and similar media and a deformable plug is realized which regardless of the wall thicknesses of the hose, the pipe, the plug is always molded to the desired, set molding degree dependent on the wall thickness.

In a preferred embodiment the plug therefore consists of a deformable metal material, such as for example sheet steel, an aluminum material, high-grade steel and similar other deformable solid materials.

By means of the optimization of the molding function the desired molding degree (variable) is always achieved regardless of the wall thickness.

Here, in accordance with an embodiment of the invention at least one sensor, preferably however several sensors, is used, said sensors being integrated in the so-called diagonal sliders, said diagonal sliders being connected to an expanding jaw with their front free ends. The expanding jaws engage in the interior of the plug to be deformed and realize the molding slot at the inner surface of the plug (directed radially outward) with an expanding shoulder correspondingly directly radially outward.

In this connection it is preferred that the sensors measuring the deformation forces are arranged in the diagonal sliders.

However, in another design of the invention provision can be made that these sensors are integrated directly in the expanding jaws themselves.

The expanding mechanism for radially outward expansion of the expanding jaws opposing each other can be altered in other respects in broad bounds. In a first preferred embodiment of the invention the expanding mechanism consists essentially of a rotary driven spindle, on which a spindle slot shifts, said spindle slot converting its axial motion into a corresponding radial expanding movement of the expanding jaws. To this purpose a tapered slide valve is fastened to the spindle slot and the tapered slide valve also executes an axial movement with the spindle slot, said axial movement acting on a diagonal slider which is forced into a radial movement and which therefore drives the expanding jaws in radial direction.

Other expanding devices can also be used in place of this drive principle using a spindle, spindle slot, tapered slide valve and diagonal slider.

In a second embodiment of the invention provision is thus made that the aforementioned tapered slide valve is part of a pipe which is shifted as a whole and thus carries the aforementioned diagonal slider along, said diagonal slider then executing the aforementioned expanding movement in the same manner. With this it has been clarified that the drive principle for the expanding device can be varied in different ways.

The subject matter of the present invention results not only from the subject matter of the individual patent claims, but rather also from the combination of the individual patent claims with each other.

In the following the invention is described more closely with the help of drawings depicting only one embodiment.

Figure 2:
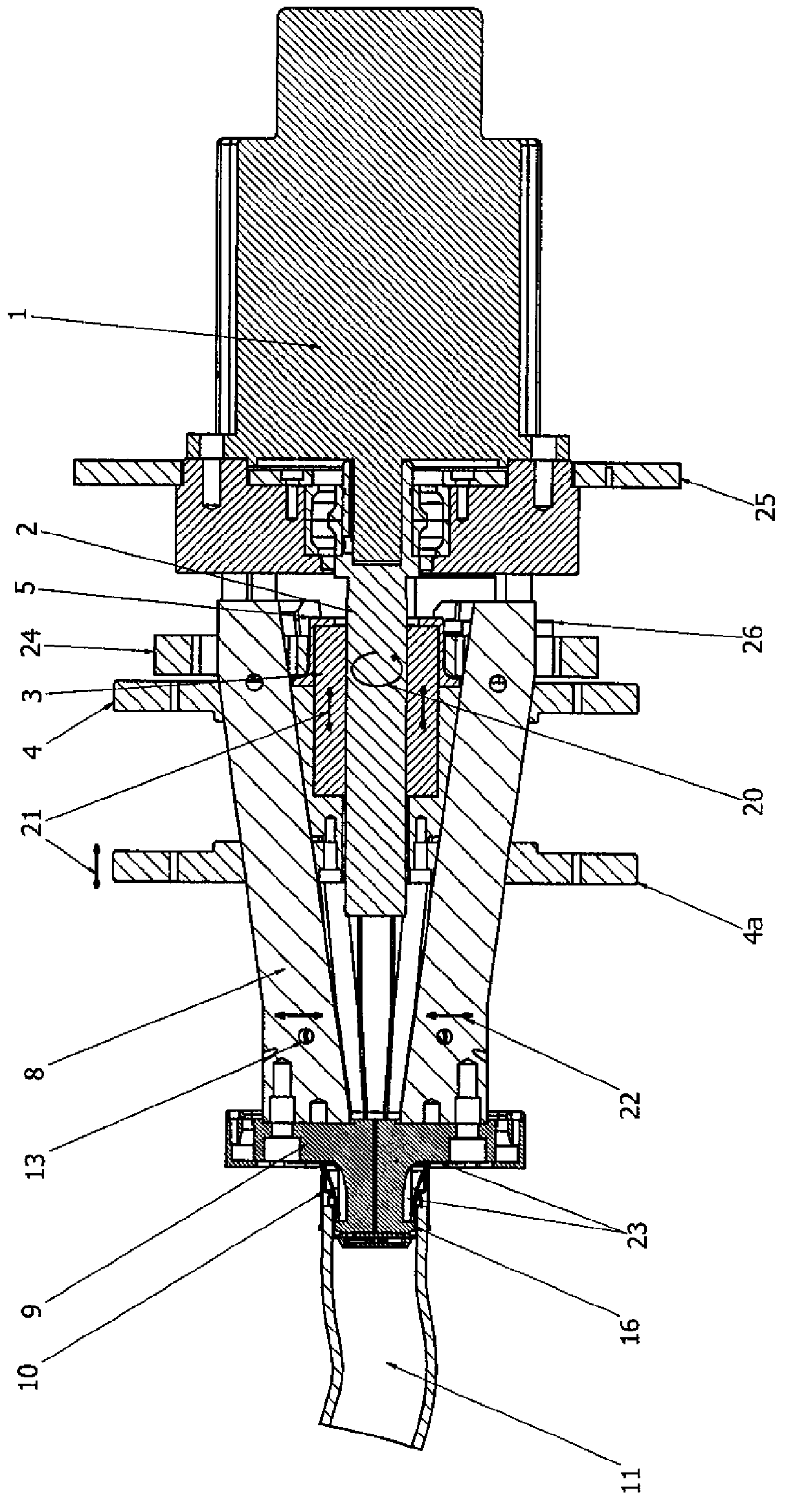
Figure 3:
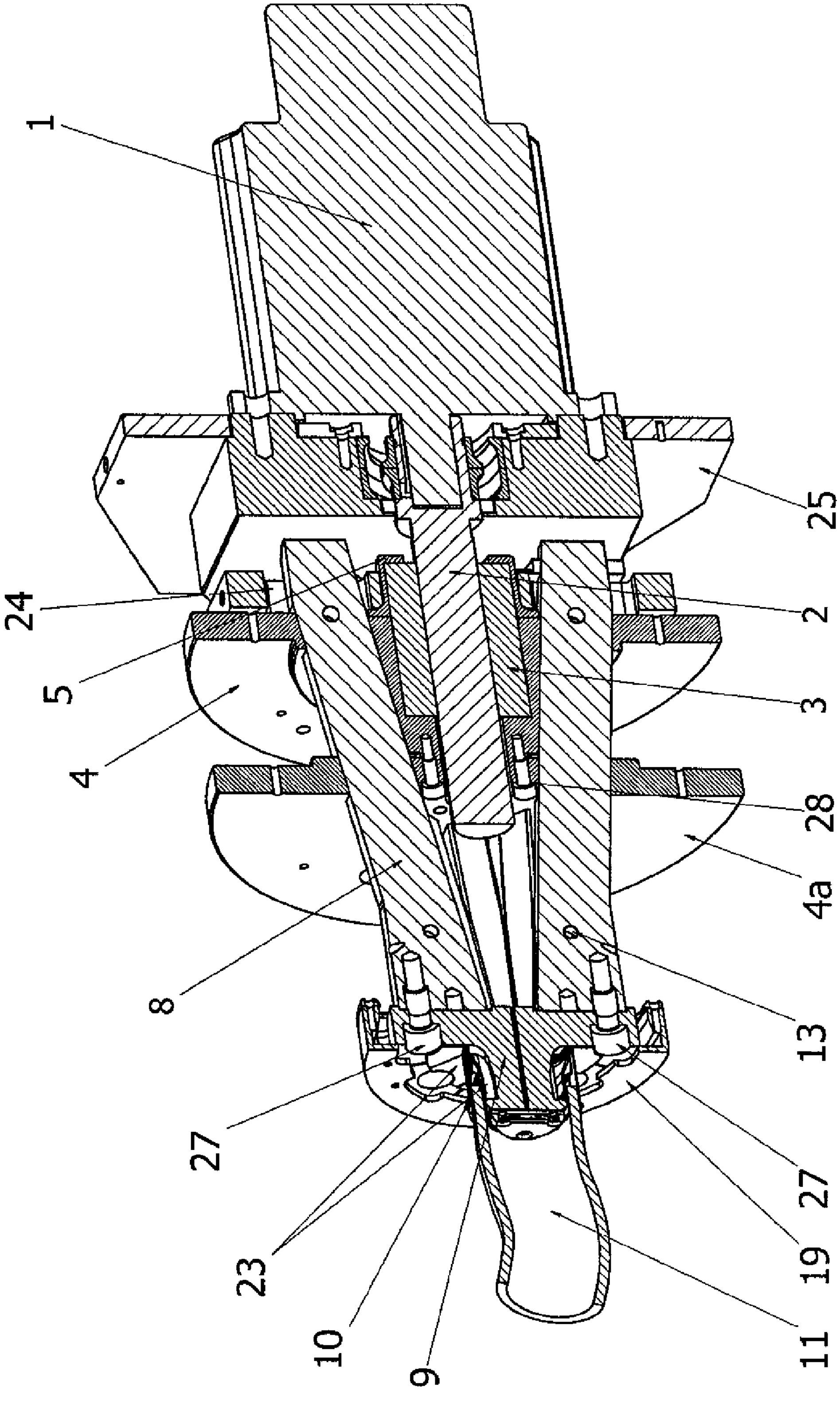
Figure 4:
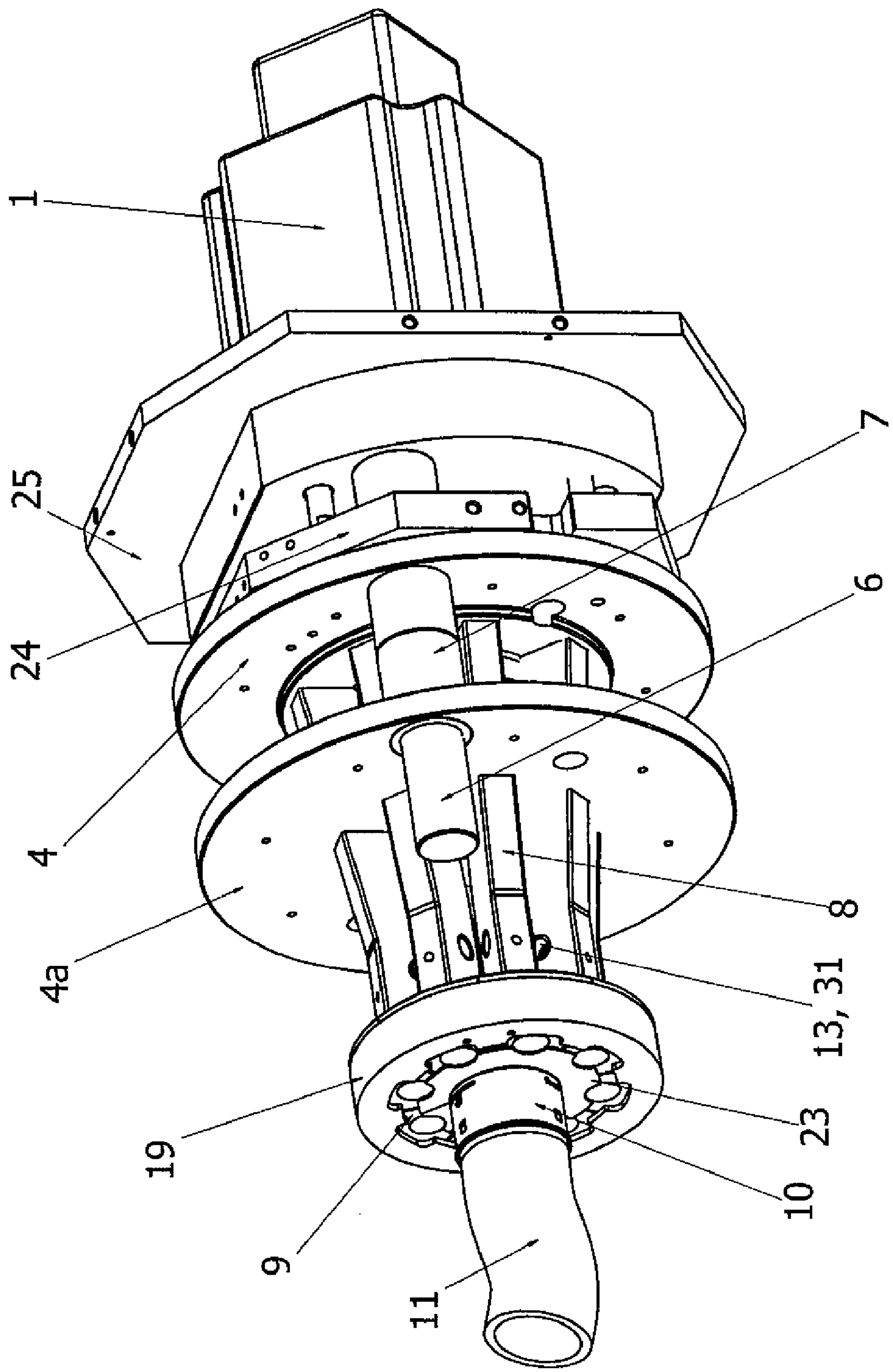
Figure 5:
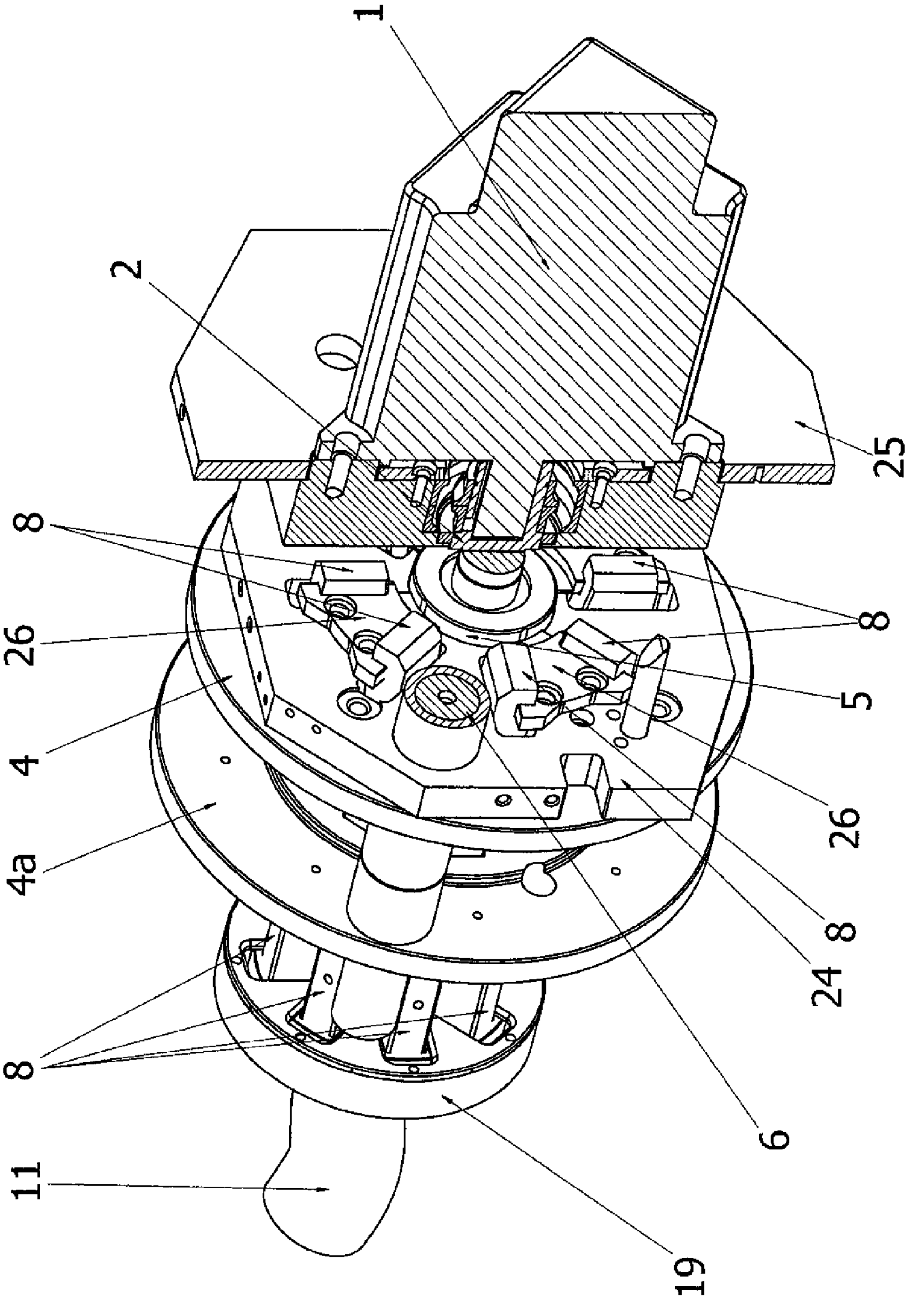
Figure 7:
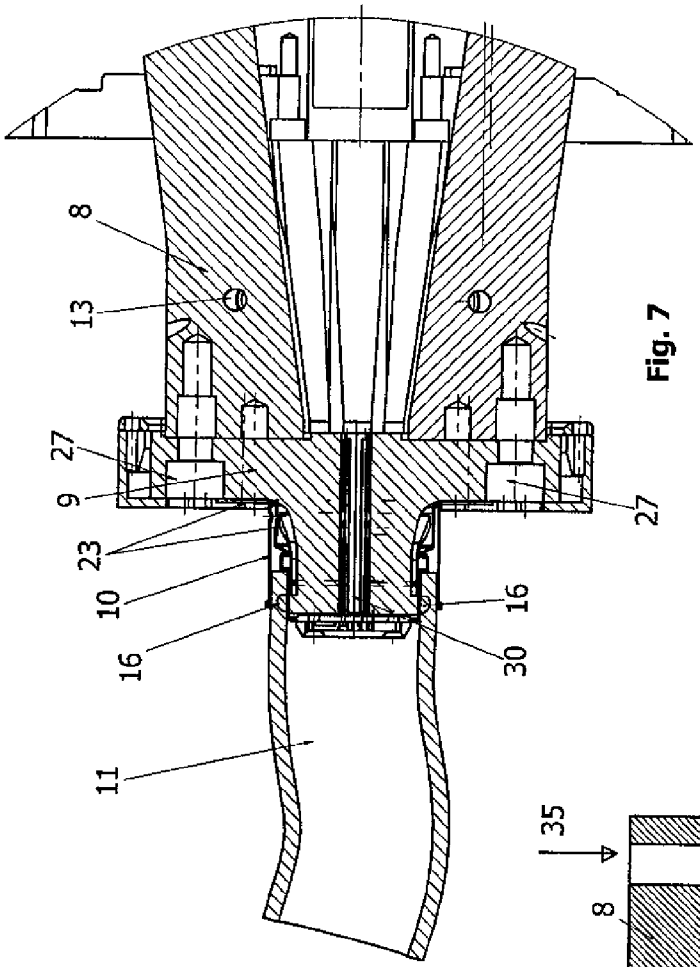
Figure 8:
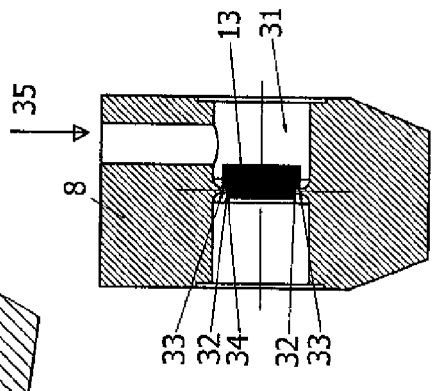
Figure 6:
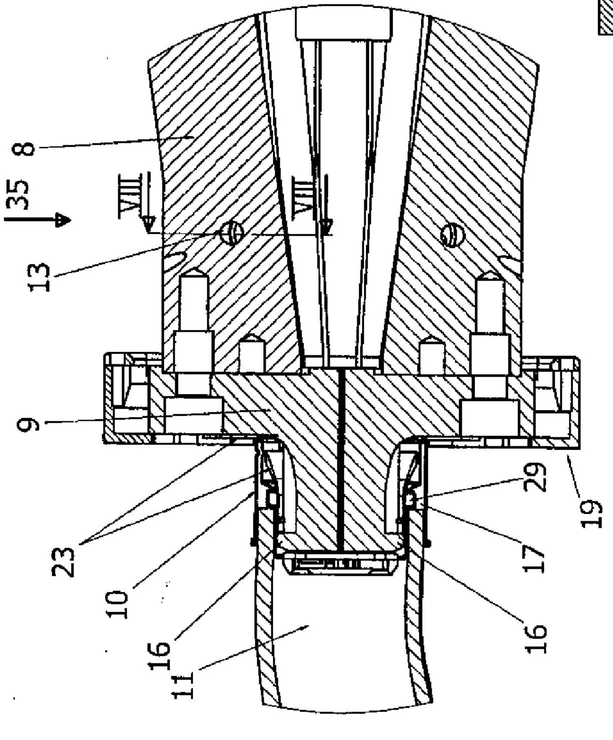
Figure 9:
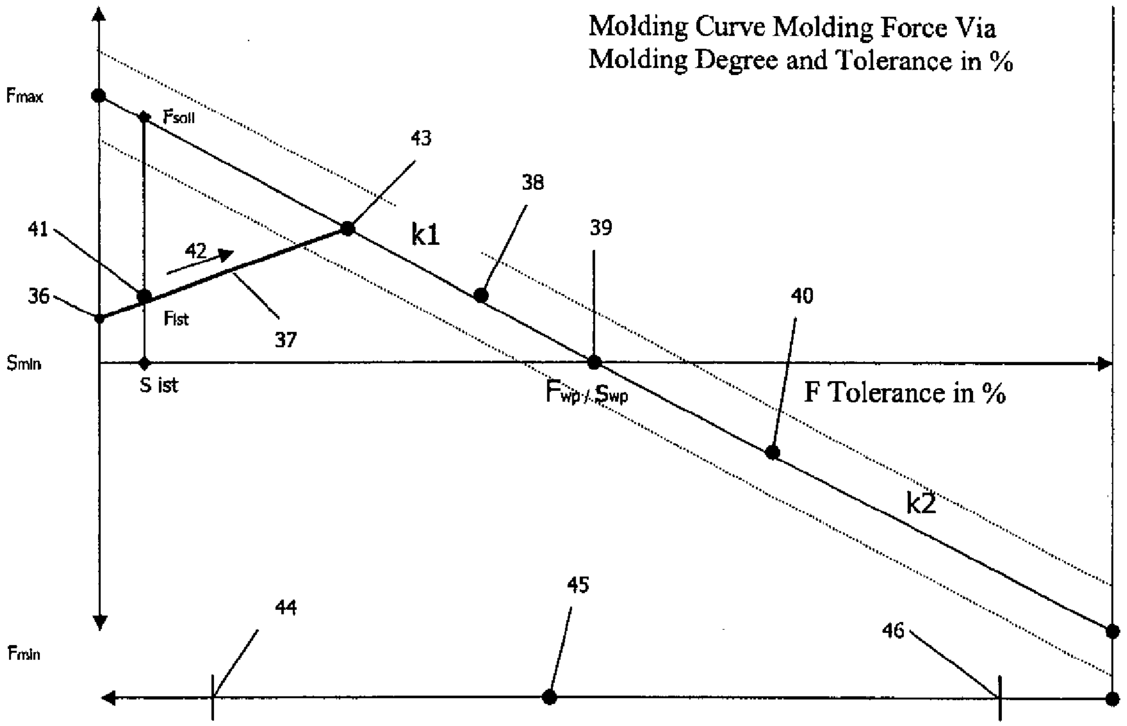

The figures show the following:

FIG. 1: schematic in perspective view the representation of a plug with a hose attached through a molding slot;

FIG. 2: a section through an expanding device according to the invention;

FIG. 3: a perspective, partially cut representation of the device according to FIG. 2;

FIG. 4: the perspective representation of the expanding device in lateral view;

FIG. 5: a further partial section through the rear region of the expanding device in perspective representation;

FIG. 6: the cut representation of the expanding tools in non-operative state;

FIG. 7: the expanding tool in the execution of the expanding operation;

FIG. 8: an enlarged sectional representation through the fastening of a sensor in the diagonal slider;

FIG. 9: a schematic representation of the path-dependent power control system.

FIG. 1 shows that a plug 10 preferably made of a metal material forms an annular gap 17, into which the front end of a hose 11 is inserted and is secured there with a molding slot 15 directed from inside to outside.

The plug 10 consists of an inner part and an outer part, said parts together forming the annular gap 17 on the free rear end. The inner and outer parts are connected to each other in one piece.

Of course provision can also be made that both parts (inner and outer parts) are joined to each other by flanging or another manner of fastening.

For the sake of completeness it is also represented that a holding fixture 29 for a sealing washer 18 connects to the annular gap 17, which then results in the sealing pipe connection with a support not shown in greater detail. The support is then inserted into the interior of the plug 10 and fastened there.

The fastening takes place with a stop spring 14, so that this plug-in connection is constructed to engage and disengage easily.

In the following an expanding device and a method for operation of the expanding device will be explained with which the molding slot 15 placed in the direction of the arrow 22 is produced.

FIGS. 2 through 7 show the same parts of the device in various representations. The same reference characters were used for the same parts so that—even if certain reference characters are not specified—the same parts are always in the same place in the drawings.

The rotational movement 20 generated by an electric motor 1 is transformed into an axial movement by a ball screw helical gear consisting of a spindle 2 and a spindle slot 3. The tapered slide valve 4 is fixed to the spindle slot 3 via the slot fastening 5. By means of this fixing and by means of a key slot connection between spindle 2 and tapered slide valve 4 the tapered slide valve 4 also executes an axial movement, since it can only execute axial movement 21 through the guide pillars 6 and linear ball-type nipples 7. As a result of the axial movement of the tapered slide valve the diagonal sliders 8 are forced into a radial movement 22 by means of the guide window inclined by 8 degrees in the tapered slide valve 4, since they cannot perform any axial movement through the fixed radial guides 26. They also move in radial direction due to the positive connection between the diagonal slider 8 and expanding jaws 9. By means of this generated movement 22 of the expanding jaws 9 the material of the plug 10 is deformed and hence molded onto the hose 11. The sensors 13 located in the diagonal sliders 8 measure the forces transferred by the expanding jaws 9, said forces being required for the deforming of the plug.

From FIG. 2 and in particular also from FIGS. 4, 6 and 7 it can be recognized that in total 8 arranged expanding jaws 9 uniformly distributed on the periphery are present, wherein each expanding jaw 9 is connected to the front free ends of the respectively associated diagonal sliders 8 with associated fastening screws 27.

The expanding jaws 9 are held in a Tool holding fixture 19, in which an axial and a radial guide 23 is present for the plug positioning of the plug 10.

The plug is plugged in on the front side of the expanding jaws 9 and locked via a slot.

The drawing does not show that in the front region of the expanding jaws 9 a guide part is present which engages in a slot of the plug 10 which is opened radially outward and with this centers the plug on the expanding jaws 9.

FIGS. 6 and 7 only show an axial stop for the rear end of the plug 10 on the expanding jaws 9.

In other respects FIGS. 2 and 5 show that a bracket plate 24 is present on which the radial guides 26 are fastened, said radial guides serving the purpose of radial guiding of the diagonal sliders 8.

FIGS. 6 and 7 show the radial expanding shoulder 16, wherein in FIG. 6 the expanding tool is in resting position and in FIG. 7 it is in operating position. It can be seen that with this the tapered slide valves 4, 4*a* are shifted in axial direction to the front to the expanding jaws 9 and in this connection simultaneously the expanding jaws 9 are displaced in radial direction outwards so that the expanding shoulder 16 on the front free ends of the expanding jaws 9 plastically deforms the material of the plug from the inner surface in the direction of the arrow 22 (see also FIG. 1) directed radially outward.

In other respects it can be seen that the entire expanding device is flange-mounted via a fastening plate 25 on the electric motor 1.

FIG. 3 additionally shows that the tapered slide valve is constructed in two parts and consists of two tapered slide valves 4, 4*a* arranged at a distance from each other, said tapered slide valves being screwed to each other via screw couplings 28.

However, the invention is not limited to this. It has already been pointed out in the general part that the tapered slide valves 4, 4*a* can also be constructed as a pipe and that this pipe can be moved in specific manner by a linear drive.

Provision is also made in another embodiment that the tapered slide valves 4, 4*a* form a one-piece continuous part.

In the production of the molding a gap 30 in accordance with FIG. 7 forms between the expanding jaws 9 which are distributed uniformly on the periphery 9.

The technical teaching that a sensor 13 is arranged in the region of the expanding tool, preferably in the region of the diagonal sliders, is important.

In this connection it is preferred that a separate sensor 13 is assigned to each diagonal slider 8.

However, provision can also be made in another embodiment that only every second or third diagonal slider 8 is equipped with a corresponding sensor.

In this connection it is important that a borehole 31 is placed in the material of the diagonal slider perpendicular to the longitudinal extension of the respective diagonal slider 8, said borehole penetrating the entire diagonal slider 8. This can be seen for example in FIG. 4.

In FIG. 7 the deformation force 35 is plotted with an arrow which acts on the exterior of the diagonal slider 8, to be precise perpendicular to the center line of the respective borehole 31 for the holding fixture of the sensor 13.

Additional details of the structure of the borehole 31 follow from FIG. 8.

It can be seen that the borehole 31 forms two opposing cross-pieces 33 in the center, between which a guide hole 34 is formed.

The button-shaped sensor 13 moves into engagement in this guide hole with its collar of decreased diameter and is positively held in the guide hole 34.

As a result of this the rotary cross-pieces 33 also act on the entire periphery on the collar of the sensor 13 and thus uniformly pick up all forces which act on the periphery in the direction of the deformation force 35.

The sensor 13 is fixed in the guide hole 34 in such a way that it has a head of an enlarged diameter and is welded to the cross-piece 33 on the cylinder of the lesser diameter in order to hold the sensor free of movement and positively locked in the guide hole 34.

With the help of FIG. 9 the control system of the measurement of force for the named automatic assembly machine will be described in greater detail. The following sequence results: By means of the coordination of a hose, pipe, . . . the parameters of the molding program are defined. For this purpose three different hose diameters are molded to the desired molding degree (variable). From this we obtain the three key parameters of the molding function.

Fmax/smin

Fwp/swp

Fmin/smax

The database calculates the two gradients k1 and k2 using these three parameters and passes them to the control system. The control system positions the mold to smin, there the program tests whether Fist<Fmax. At this point the path-dependent power control system begins. In the process the control system has to continuously calculate Fsoll (variable curve), which changes with increasing sist.

The control system has to position until Fsoll=Fist deceleration tolerance has been reached, that is when the Actual curve—of the deceleration tolerance intersects with the target curve the molding is finished.

The advantage of the control system is that regardless of the wall thicknesses of the hose, of the pipe, of the plug the program always molds to the desired—dependent on the path/wall thickness, set—molding degree.

Basic Molding Sequence:

run to minimum molding path check whether Actualforce<Fmax continue until Endforce has been reached, Fsoll has to be continuously calculated stop when Fsoll=Fist–Bremstoleranz has been reached check whether we are in the bounds of the concentrated forces continuous monitoring of the stop criteria Definition Molding:

| | Codes: |
|---|---|
| smax | MaxMoldpath (mm) |
| swp | PathTurningpoint (mm) |
| smin | MinPath (mm) |
| Fmax | MaxEndforce (N) |
| Fwp | ForceTurningpoint (N) |
| Fmin | MinEndforce (N) |
| min./max Einzel-F | Concentrated force tolerance (%) |
| F-Toleranz in % | Endforce tolerance (%) |
| F-Riβ | Crackdetection (?) |
| k1 | Gradient 1 |
| k2 | Gradient 2 |
| Tk1 | Tempfactor k1 |
| Tk2 | Tempfactor k2 |
| Tswp | TempfactorPathWP |
| v schnell | v fast (mm/s) |
| v langsam | v slow (mm/s) |
| v langsam ab Weg | v slow from path (mm) |
| Vorpreβeinzelkraft | Premoldforce (N) |
| Stillstandszeit | Downtime (ms) |

FIG. 9 shows the deformation force on the ordinate, while the path of deformation is shown on the abscissa. To be more precise it is a matter of the path which the expanding shoulders 16 of the expanding jaws 9 execute in radial direction.

Proceeding from position 36 the bracing operation begins now and first a quasi-linear deformation takes place on the straight line 37. A molding curve 38 is defined, which represents the connection between molding force and molding degree.

Beginning from a turning point 39 the molding curve can also take on another form. This is shown with molding curve 40.

In the case of position 41 and continuously in the case of the method on the straight line 37 in the direction of the arrow 42 for example with position 41 the target force is determined which is necessary for the molding and which represents the end force. In this connection the maximum force $F_{max}$ should not be exceeded.

Therefore several consecutive positions 41 on the straight line 37 are scanned and an actual-force is always compared to a target-force until the actual-force corresponds to the target-force in position 43, wherein a specific tolerance still has to be taken into account.

In this point (Position 43) the molding is now finished.

The representation in FIG. 9 with straight line 45 shows the total hose wall thickness between a minimum and a maximum value.

For example if the hose wall thickness in the case of a thick hose is defined at position 44 then one recognizes in the diagram that a relatively high molding force is required.

However, if a relatively low hose wall thickness is molded at position 46, then one sees that the molding force is only slight. This results in the intersection point on the straight line 40 (Molding curve).

With this there is the advantage that for the first time now the deformation forces on the expanding jaws 9 can be directly measured and with it a path-dependent power control system for molding is proposed, as a result of which the molding function is optimized and is independent of the wall thickness of the molding materials, so that the desired molding degree is always reached.

| Legend of the Drawings | |
|---|---|
| 1 | Electric motor |
| 2 | Spindle |
| 3 | Spindle slot |
| 4 | Tapered slide valve 4a |
| 5 | Slot fastening |
| 6 | Guide pillar |
| 7 | Linear ball type nipple |
| 8 | Diagonal slider |
| 9 | Expanding jaw |
| 10 | Plug |
| 11 | Hose |
| 12 | Sensor |
| 13 | Stop spring |
| 14 | Molding slot |
| 15 | Expanding shoulder |
| 16 | Annular gap (Stecker 10) |
| 17 | Sealing washer |
| 18 | Tool holding fixture |
| 19 | Rotational movement |
| 20 | Movement |
| 21 | Radial movement |
| 22 | Guide (axial and radial) |
| 23 | Bracket plate |
| 24 | Fastening plate |
| 25 | Radial guide |
| 26 | Fastening screw |
| 27 | Screw coupling |
| 28 | Holding fixture (for sealing washer 18) |
| 29 | Gap |
| 30 | Borehole |
| 31 | Fastening point |
| 32 | Cross-piece |
| 33 | Guide hole |
| 34 | Deformation force |
| 35 | Position |
| 36 | Straight line (Actual-curve) |
| 37 | Molding curve |
| 38 | Turning point |
| 39 | Molding curve |
| 40 | Position |
| 41 | Direction of the arrow |
| 42 | Position |
| 43 | Position |
| 44 | Straight line |
| 45 | Position |

The invention claimed is:

1. A device for the molding of plugs as part of a pipe connection, wherein the pipe connection is constructed as a sealing plug-in connection with a connecting piece and plug that can be locked with the connecting piece, wherein the plug includes an outer part and an inner part connected to each other in one piece and forms an annular gap on a rear free end thereof, wherein a molding slot is placed in the material of the plug with an expanding tool acting in radial direction, said molding slot engaging in the material of a pipe or hose, and at least one sensor subject to a radial deformation arranged in at least one location of an expanding jaw of the tool, said sensor recording the radial deformation work of the expanding jaw and regulating the expanding expansion of the expanding tool.

2. The device according to claim 1, wherein the expanding tool includes an electric motor which converts a rotational movement into an axial movement by means of a spindle and a spindle slot, and a tapered slide valve fastened to the spindle slot is penetrated by guide pillars, as a result of which said tapered slide valve executes the axial movement.

3. The device according to claim 2, wherein the tapered slide valve includes two tapered slide valves arranged at a distance from each other, said tapered slide valves being firmly connected to each other via screw couplings.

4. The device according to claim 2, wherein the tapered slide valve includes inclined guide windows which are penetrated by diagonal sliders which form a radial movement by means of fixed radial guides, wherein the diagonal sliders are positively connected to the expanding jaws with associated fastening screws on front free ends of the associated diagonal slider.

5. The device according to claim 4, wherein the at least one sensor is arranged in a borehole arranged perpendicular to the longitudinal extension of the respective diagonal slider, and wherein the borehole penetrates the entire respective diagonal slider.

6. The device according to claim 5, wherein the borehole exhibits two opposing, rotary cross-pieces in the center with a guide hole for the sensor located in between.

7. The device according to claim 6, wherein the at least one sensor includes a head of enlarged diameter which is welded to a cylinder surface of lesser diameter with cross-pieces and so thus holds the sensor free of movement and positively locked in the guide hole.

8. The device according to claim 2, wherein the expanding tool forms the molding slot directed outward from an inner periphery of the plug and the sensor records occurring expanding forces directed from radial inside to radial outside, to thereby form a path-dependent power control system.

9. The device according to claim 2, wherein the tapered slide valves fastened to the spindle slot are constructed as part of a pipe and/or in a single piece.

10. The device according to claim 2, wherein the expanding tool is fastened by means of a fastening plate on the electric motor.

11. The device according to claim 1, wherein the expanding jaws are held in a tool holding fixture which includes a radial and axial guide for positioning and centering of the plug.

12. The device according to claim 1, wherein the sensor for recording of the deformation work is arranged in a diagonal slider and/or in the expanding jaw of the expanding tool for production of the molding slot.

13. The device according to claim 1, wherein the plug comprises a deformable metal material in which the front end of a hose is inserted and is fixed with the molding slot directed from inside to outside.

14. The device according to claim 1, wherein the expanding jaw, which engages in the interior of the plug to be deformed, includes an expanding shoulder directed radially outward and forms the molding slot by means of molding on an inner surface of the plug.

15. The device according to claim 1, wherein expansion executed by means of the expanding jaws can be varied.

16. The device according to claim 1, wherein the expanding tool includes a bracket plate which is constructed for the purpose of mounting radial guides.

17. The device according to claim 1, wherein a molding forms a gap between expanding jaws distributed uniformly on the periphery.

* * * * *